United States Patent [19]

Teratani

[11] Patent Number: 5,798,009
[45] Date of Patent: Aug. 25, 1998

[54] FOAMED RUBBER COMPOSITIONS FOR TIRES AND PNEUMATIC TIRE USING THE SAME

[75] Inventor: Hiroyuki Teratani, Kodaira, Japan

[73] Assignee: Bridgestone Corporation, Tokyo, Japan

[21] Appl. No.: 579,200

[22] Filed: Dec. 27, 1995

[30] Foreign Application Priority Data

| Dec. 27, 1994 | [JP] | Japan | 6-326065 |
| Feb. 14, 1995 | [JP] | Japan | 7-24974 |
| Aug. 30, 1995 | [JP] | Japan | 7-221589 |
| Aug. 31, 1995 | [JP] | Japan | 7-223129 |

[51] Int. Cl.$^6$ .................. B60C 9/02; C08J 9/06
[52] U.S. Cl. .......... 152/548; 152/564; 264/45.1; 264/45.3; 264/48; 521/99; 521/122; 521/123; 521/131; 521/142; 521/143; 521/146; 521/148; 521/150
[58] Field of Search .......... 521/99, 131, 142, 521/143, 146, 148, 150, 122, 123; 264/45.1, 45.3, 48; 152/548, 564

[56] References Cited

FOREIGN PATENT DOCUMENTS

| 0654363 A1 | 5/1995 | European Pat. Off. |
| 55-135149 | 10/1955 | Japan |
| 58-199203 | 11/1958 | Japan |
| 46-31732 | 9/1971 | Japan |
| 56-52057 | 12/1981 | Japan |
| 60-137945 | 7/1985 | Japan |
| 63-89547 | 4/1988 | Japan |
| 4-365606 | 12/1992 | Japan |
| 6-102737 | 12/1994 | Japan |

OTHER PUBLICATIONS

Abstract "Tread Rubber Composition for Tire", 2-272042, Nov. 6, 1990, Japan.
Abstract Derwent Class A95, AN 90-243628, Jul. 2, 1990.
Abstract Derwent Class A12, AN 91-314639, Sep. 13, 1991.

*Primary Examiner*—John M. Cooney, Jr.
*Attorney, Agent, or Firm*—Sughrue, Mion, Zinn, Macpeak & Seas, PLLC

[57] ABSTRACT

A foamed rubber composition for tire comprises a particular amount of particles having specified hardness and average particle size and containing aluminum-bonded hydroxy group and/or silicon-bonded hydroxy group at its surface, and a particular amount of at least one specified silane coupling agent, and develops excellent performances on ice. Further, pneumatic tires contain the foamed rubber composition as a tread rubber.

9 Claims, No Drawings

FOAMED RUBBER COMPOSITIONS FOR TIRES AND PNEUMATIC TIRE USING THE SAME

BACKGROUND OF THE INVENTION

1. Field of the Invention

This invention relates to novel foamed rubber compositions for tires and a pneumatic tire using the same, more particularly this invention relates to a foamed rubber composition for tire having a high friction coefficient even on ice and/or snow road surfaces and a method of producing the same as well as a pneumatic tire for passenger cars, truck, bus and the like using the same.

2. Description of the Related Art

Recently, the demand for so-called all season tires capable of use without a tire exchange even in winter season likewise summer season is increasing. This type of the all season tire develops dry gripping property, wet gripping property, steering stability, durability and low fuel consumption even in winter season likewise summer season, and further has sufficient traction and braking performances on snow and/or ice roads.

As a tread rubber used in the all season tire, there have hitherto been known a method of decreasing a hardness at a low temperature in a tread rubber for summer season, a method of using a polymer having a low glass transition temperature or using a softening agent capable of adequately holding a modulus of elasticity of the tread rubber at a low temperature, and the like.

In the former method, however, the performances at snow and ice temperature range are almost developed owing to the hysteresis property of the polymer, however there are problems that the braking performance and steering stability on wet and dry roads are insufficient. On the other hand, the latter method is disclosed, for example, in JP-A-55-135149, JP-A-58-199203, JP-A-60-137945 and the like, but has a serious problem that it badly affects the wear resistance and durability in running on general-purpose roads though the performance on snow and/or ice roads is improved.

In any case, the tread rubbers produced by the above methods certainly exhibit good performances at a relatively low temperature range of not higher than ±5° C. or at so-called dry-on-ice state, but do not provide sufficient friction coefficient at a wet state of about 0° C. or at so-called wet-on-ice state, so that it can not be said that the traction performance, braking performance and steering stability are sufficiently improved.

Lately, there are adopted some processes of applying means for the improvement of friction force to the tread rubber composition itself. As a first process, there is a process wherein the tread rubber is foamed by a proper means to form closed cells in the tread rubber composition (JP-A-63-89547). In general, a layer called as a false liquid layer is existent on a surface of an ice. When an object is forcedly moved on the ice surface, a part of the false liquid layer changes into a water film, which acts as a lubricant to develop a low friction constant. In the first process, the surface of the thus obtained tread rubber are covered with a great number of cells, so that the removal of water film created on a zone contacting with ice surface and the edge action of scraping the false liquid layer accompanied with a microscopic movement of the cell are developed to provide high friction properties on ice. The tires manufactured by using this process are commercially available as a studless tire. However, they have the effect of removing the false liquid layer from the ice surface, but can not directly scrape or break the ice itself different from the conventionally used spike tire, so that the improvement of the performances on ice is not yet satisfied.

As a second process, there is a process for attaining the high friction properties on ice by incorporating various high-hardness materials into the tread rubber to utilize the scratching effect of these materials on ice surface (JP-B-46-31732, JP-A-51-147803, JP-B-56-52057 and JP-B-6-102737). This process is used for providing the high friction properties of the tread rubber on ice by a mechanism different from the above first process. In fact, as the amount of the high-hardness material incorporated becomes larger, the tread rubber tends to provide the high friction properties on ice.

In the first process, the surface of the tread rubber is rendered into a rugged surface by foaming or falling of foreign matter, so that ice surface is scratched by convex portions of the rugged surface and water existing on ice surface is absorbed and discharged by concave portions of the rugged surface. However, the hardness of the rubber relatively lowers as compared with the ice surface at a low temperature range (not higher than ±3° C. in usual case), so that the scratching effect can not be expected at such a low temperature range.

In the second process of incorporating the high-hardness material developing a high scratching effect into the matrix rubber of the tread, the effect of improving performance on ice at about 0° C. having a large water content is small at this temperature. Further, the high-hardness material is existent as a foreign matter having no affinity with rubber, so that the wear resistance and fatigue properties are considerably degraded.

Under the above circumstances, the inventor has examined the incorporation of composite particle consisting of syn-1,2-polybutadiene resin, sulfur, vulcanization accelerator, carbon black and scorch retarder into a foamed tread rubber in order to simultaneously establish the improvement of performances on snow and ice road surfaces at wet state and the wear resistance and/or confirmed that the use of such a composite particle is not yet sufficient in a level required for commercial markets. That is, it is demanded to further improve the composite particle.

Moreover, the actual ice surface temperature variously changes over a time of from day to night, so that it is strongly desired to develop a tire tread indicating more stable performance on ice at a wider temperature range and causing no degradation of wear resistance and fatigue properties.

On the other hand, the conventional foamed rubber has a function of improving the friction coefficient on ice by the dewatering and water discharging effects of flowing out water film generated between a ground contact region of the tire and an ice road surface. However, such effects are critical in order to remove a greater amount of water film at the wet-on-ice state, so that it is difficult to improve the friction coefficient on ice at the wet-on-ice state.

Alternatively, the performance on ice is improved to a certain extent by incorporating particles having particular particle size and hardness as a microspike for developing the scratching effect into the tread rubber, however the synergistic action between the scratching effect and the water discharging effect is less, so that the level of the performance on ice is still insufficient. That is, the feature that the synergistic action is small is due to the fact that the hardness of the particle is in inverse proportion to the adhesion property of the particle to rubber. In the conventional technique, as the particle becomes harder, the adhesion property of the particle to rubber lowers though the scratching effect is improved. As a result, the particles are apt to fall out from the ground contact region of the tread at a friction face between the tire and the road surface and hence the number of effective microspikes undesirably reduces as a result the scratching effect is not held long and also there are problems that the wear resistance and crack resistance are degraded. When the hard particles are added to a rubber composition containing a foaming agent, the foaming is caused at boundary surfaces of the particles to lower the adhesion force to rubber matrix.

SUMMARY OF THE INVENTION

It is, therefore, an object of the invention to provide a novel foamed rubber composition for tires developing the scratching effect by compounding sufficiently hard particles and enhancing the continuity of this effect by strongly bonding these particles to rubber matrix through a silane coupling agent to thereby develop a true synergistic action between the scratching effect and the water discharging effect.

It is another object of the invention to provide a method of producing the above foamed rubber composition as well as a pneumatic tire for passenger cars, truck and bus and the like using the same.

According to a first aspect of the invention, there is the provision of a foamed rubber composition comprising 3–30 parts by weight, based on 100 parts by weight of rubber ingredient, of particles having a JIS C-type hardness of not less than 75 and an average particle size of 5–250 μm and containing aluminum-bonded hydroxy group and/or silicon-bonded hydroxy group at its surface, and 3–50% by weight, based on the weight of the particles, of at least one silane coupling agent represented by the following general formula:

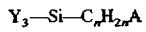

wherein, A is —S$_m$C$_n$H$_{2n}$Si—Y$_3$ group or Z group, Y is an alkyl or alkoxy group having a carbon number of 1–4 or chlorine atom, provided that three Y groups may be same or different, Z is

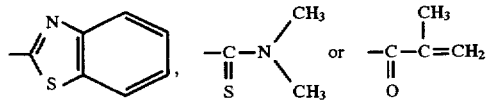

and m and n are an integer of 1–6, respectively.

In a preferable embodiment of the first invention, the particle consists of at least 20% by weight of at least one selected from Al(OH)$_3$ and SiO$_2$ and the remainder being an organic binder.

In another preferable embodiment of the first invention, the foamed rubber composition has an expansion ratio of 5–35%.

According to a second aspect of the invention, there is the provision of a method of producing a foamed rubber composition by kneading at least rubber ingredient, silane coupling agent and particles having an average particle size of 5–250 μm, adding with a foaming agent and then curing, characterized in that at least one compound represented by the following general formula:

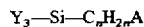

wherein, A is —S$_m$C$_n$H$_{2n}$Si—Y$_3$ group or S$_m$—Z group, Y is an alkyl or alkoxy group having a carbon number of 1–4 or chlorine atom, provided that three Y groups may be same or different, Z is

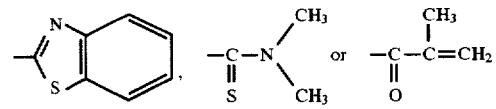

and m and n are an integer of 1–6, respectively, is used as the silane coupling agent, and the particles have a JIS C-type hardness of not less than 75 and contain aluminum-bonded hydroxy group and/or silicon-bonded hydroxy group at its surface, and the kneading is carried out at a final temperature of at least 150° C.

In a preferable embodiment of the second invention, the particle consists of at least 20% by weight of at least one selected from Al(OH)$_3$ and SiO$_2$ and the remainder being an organic binder.

In another preferable embodiment of the second invention, the particles are added in an amount of 3–30 parts by weight based on 100 parts by weight of the rubber ingredient, and the silane coupling agent is used in an amount of 3–50% by weight based on the weight of the particles.

In the other preferable embodiment of the second invention, curing is carried out at an expansion ratio of 5–35%.

According to a third aspect of the invention, there is the provision of a pneumatic tire comprising a tread, said tread being made from a foamed rubber composition comprising 3–30 parts by weight, based on 100 parts by weight of rubber ingredient, of particles having a JIS C-type hardness of not less than 75 and an average particle size of 5–250 μm and containing aluminum-bonded hydroxy group and/or silicon-bonded hydroxy group at its surface, and 3–50% by weight, based on the weight of the particles, of at least one silane coupling agent represented by the following general formula:

wherein, A is —S$_m$C$_n$H$_{2n}$Si—Y$_3$ group or S$_m$—Z group, Y is an alkyl or alkoxy group having a carbon number of 1–4 or chlorine atom, provided that three Y groups may be same or different, Z is

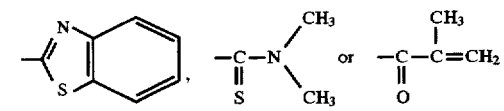

and m and n are an integer of 1–6, respectively, and having an expansion ratio of 5–35%.

In a preferable embodiment of the third invention, the particle consists of at least 20% by weight of at least one selected from Al(OH)$_3$ and SiO$_2$ and the remainder being an organic binder.

DESCRIPTION OF THE PREFERRED EMBODIMENTS

According to the invention, a rubber ingredient is added with particular particles and coupling agent and sufficiently kneaded at a kneading temperature of not lower than 150° C. and then cured to sufficiently adhere the particular particles to rubber matrix. As a result it is possible to include closed cells into the rubber matrix while preventing the separation of the particles and the foaming at the boundary surfaces of the particles.

As the rubber ingredient used in the invention, mention may be made of at least one rubber selected from the group consisting of natural rubber, diene series rubbers such as isoprene rubber, butadiene rubber, styrene-butadiene rubber and the like, and non-diene series rubbers such as butyl rubber and the like.

The particle used in the invention has a JIS C-type hardness of not less than 75 and an average particle size of 5-250 μm and contains aluminum-bonded hydroxy group and/or silicon-bonded hydroxy group at its surface. When the JIS C-type hardness is less than 75, the sufficient scratching effect of the particles is not obtained. The JIS C-type hardness of the particle is preferably not less than 90, more particularly not less than 95. Especially, when the particles having such a high hardness are incorporated into a foaming rubber matrix, if the resulting foamed rubber is used as a tread rubber of the pneumatic tire, the scratching effect of the particles is developed even at such a low temperature that the hardness of ice is very high. Thus the high friction properties can be attained to improve braking performance and the like.

The average particle size of these high-hardness particles is restricted to a range of 5-250 μm. When the average particle size is less than 5 μm, the sufficient scratching effect is not obtained, when it exceeds 250 μm, there are caused problems on the wear resistance, crack resistance, durability and the like.

Moreover, the average particle size is measured by laser diffraction process (light scattering process) using a particle size analyzer of NIKKISO microtrack MKII (made by Nikkiso Kabushiki Kaisha) according to usual manner.

The amount of these particles added is 3-30 parts by weight based on 100 parts by weight of the rubber ingredient. When the amount of the particles is less than 3 parts by weight, a sufficient scratching effect is not obtained, when it exceeds 30 parts by weight, there is caused problems on the durability and the like.

As the particles containing aluminum-bonded hydroxy group and/or silicon-bonded hydroxy group at its surface, mention may be made of $Al(OH)_3$, $SiO_2$, 1,4-bis (hydroxydimethylsilyl) benzene, diphenylsilane diol, triethyl silanol, triphenyl silanol and the like. Among them, it is preferable that the particle consists of at least 20% by weight of at least one selected from $Al(OH)_3$ and $SiO_2$ and the remainder being an organic binder. In this case, when the amount is less than 20% by weight, the reactive site of the particle to the coupling agent is less and the adhesion property can not be ensured, also the foaming is caused at the boundary surface of the particle to bring about the degradation of adhesion force and resistance to breakage.

As the organic binder, use may be made of polymethyl methacrylate (PMMA), polyvinyl alcohol (PVA), polyvinyl acetate, polyacrylic acid, styrene-butadiene copolymer resin, polyester resin, epoxy resin, acrylic resin, phenolic resin, melamine resin, polypropylene resin (PP), syn-1,2-polybutadiene resin and the like.

As the silane coupling agent represented by the general formula of $Y_3-Si-C_nH_{2n}A$ according to the invention, use may be made of bis(3-triethoxysilylpropyl) tetrasulfide, bis (2-triethoxysilylethyl) tetrasulfide, bis(3-trimethoxysilylpropyl) tetrasulfide, bis(2-trimethoxysilylethyl) tetrasulfide, 3-mercaptopropyl trimethoxy silane, 3-mercaptopropyl triethoxy silane, 2-mercaptoethyl trimethoxy silane, 3-nitropropyl trimethoxy silane, 3-nitropropyl triethoxy silane, 3-chloropropyl trimethoxy silane, 3-chloropropyl triethoxy silane, 2-chloroethyl trimethoxy silane, 2-chloroethyl triethoxy silane, 3-trimethoxysilylpropyl-N,N-dimethylthiocarbamoyl tetrasulfide, 3-triethoxysilylpropyl-N,N-dimethylthiocarbamoyl tetrasulfide, 2-triethoxysilylethyl-N,N-dimethylthiocarbamoyl tetrasulfide, 3-trimethoxysilylpropylbenzothiazole tetrasulfide, 3-triethoxysilylpropylbenzothiazole tetrasulfide, 3-triethoxysilylpropyl methacrylate monosulfide, 3-trimethoxysilylpropyl methacrylate monosulfide and the like. Among them, bis(3-triethoxysilylpropyl) tetrasulfide, 3-trimethoxysilylpropylbenzothiazole tetrasulfide and the like are favorable. When three Y groups in the general formula are different, there are mentioned, for example, (3-diethoxymethylsilylpropyl) tetrasulfide, 3-mercaptopropyl dimethoxymethyl silane, 3-nitropropyl dimethoxymethyl silane, 3-chloropropyl dimethoxymethylsilane, dimethoxymethylsilylpropyl-N,N-dimethylthiocarbamoyl tetrasulfide, dimethoxymethylsilylpropylbenzothiazole tetrasulfide and the like.

The amount of the silane coupling agent added is 3-50% by weight based on the weight of the particles. When the amount of the silane coupling agent is less than 3% by weight, the sufficient adhesion force is not obtained, while when it exceeds 50% by weight, a great amount of sulfur atom is discharged from the group A of excessive coupling agent to increase the modulus of elasticity of rubber, and also the cost is undesirably and largely increased.

As the foaming agent used in the invention, mention may be made of azodicarbonamide, dinitrosopentamethylene tetramine, azobisisobutyronitrile, and aromatic sulfonylhydrazides such as benzene sulfonylhydrazide, toluene sulfonylhydrazide, oxybisbenzene sulfonylhydrazide and the like.

According to the invention, the foaming rubber composition is cured at an expansion ratio of 5-35% by using the foaming agent, whereby closed cells are formed in the foamed rubber. The presence of such closed cells is indispensable to increase a microscopically water discharging effect at a state of existing a great amount of water on ice surface of about 0° C. to develop the excellent performances on snow and ice surfaces. When the expansion ratio is less than 5%, the foaming effect is not sufficient, while when it exceeds 35%, the rigidity of rubber is insufficient, and if such a foamed rubber is used in the tread, the wear resistance is degraded and the cracking at groove bottom is largely created.

The term "expansion ratio" used herein is represented by the following equation (1):

$$V_s = \{(p_0 - p_g)/(p_1 - p_g) - 1\} \times \phi(\%) \quad (1)$$

wherein, $p_1$ is a density of foamed rubber (g/cm$^3$), $p_0$ is a density of solid phase portion in the foamed rubber (g/cm$^3$), and $p_g$ is a density of gas portion in the foamed rubber (g/cm$^3$). The foamed rubber is composed of the solid phase portion and the gas portion formed in the solid phase portion as a cavity (closed cell). Therefore, the density $p_g$ of the gas portion is very small and is approximately near to zero, so that the equation (1) is approximated to the following equation (2):

$$V_s = \{(p_0/p_1) - 1\} \times 100 \ (\%) \quad (2)$$

Moreover, the foamed rubber composition according to the invention may be compounded with additives usually used in the manufacture of the pneumatic tire such as carbon black, silica, vulcanizing agent, vulcanization accelerator, antioxidant and the like.

In the production of the foamed rubber composition, the rubber ingredient, silane coupling agent, particles and the like are kneaded in a kneader at a final kneading temperature of not lower than 150° C. before the addition of the foaming agent, whereby S—S bond in the group A of the general formula of the silane coupling agent reacted with the surfaces of the particles is cleaved and reacted with matrix rubber, while the functional groups of the silane coupling agent (polar groups in the groups A and Y) are reacted with the particles to form particle gel having such a shape that the particles are restrained with the matrix rubber. Thus, the surroundings of the particles are enveloped with the matrix rubber by the primary reaction therewith, so that the sufficient adhesion force can be ensured. Furthermore, there is no active point of the foaming gas in the surfaces of the particles accompanied with the above reaction, so that the foaming at the boundary surface of the particle is not caused in the curing reaction and consequently the closed cells can be existed in the matrix rubber independently of the particles. As a result, the stronger adhesion force can be obtained.

On the other hand, when the final kneading temperature is lower than 150° C., the reactions between the polar group of the coupling agent and the particle is not sufficiently conducted and hence the formation of the particle gel is insufficient and the adhesion of the particles to the rubber matrix becomes insufficient. As a result, a portion of the particle not enveloping with the rubber matrix is existent on the particle surface and forms a reactive point of the foaming gas, so that the foaming is created at the boundary surface of the particle during the curing to considerably degrade the adhesion of the particles to the rubber matrix. If the resulting foamed rubber is used in the tire tread, the desired performances on ice are not obtained, but also the wear resistance and crack resistance are considerably degraded.

The foamed rubber composition according to the invention is applied to a tread in pneumatic tires, particularly pneumatic radial tires for passenger cars, truck, bus and heavy duty vehicles used on snow and/or ice road surfaces, whereby the excellent running performances on snow and/or ice roads are stably obtained over a wider temperature range. Further, the foamed rubber composition may be applied to other rubber articles such as a shoe sole, caterpillar track and the like.

The following examples are given in illustration of the invention and are not intended as limitations thereof.

Various foamed rubber compositions are prepared by kneading various components according to compounding recipes as shown in Table 1 at a kneading temperature as shown in Table 1 and then curing under usual conditions. Furthermore, various pneumatic tires having a tire size of 185/70R13 are manufactured by using these foamed rubber compositions as a tread of the tire. The properties of the foamed rubber and the performances of the pneumatic tire are measured according to the following methods to obtain results as shown in Table 1.

(1) Resistance to breakage

The tensile strength of the foamed rubber is measured according to a method of JIS K6301 and represented by an index on the basis that Comparative Example 1 is 100. The larger the index value, the better the resistance to breakage.

(2) E' (−20° C.)

The modulus of elasticity (E') at −20° C. is measured with respect to the foamed rubbers in order to confirm that the property at low temperature is satisfactorily maintained in the foamed rubbers according to the invention because the lowering of the modulus of elasticity at low temperature is carried out as a method of improving the performances on ice.

(3) Percentage of particles retained in tread rubber after the running

After the tire to be tested is run on a test course over a distance of 200 km, the number of retaining particles (A) per 1 $mm^2$ of a surface area of a tread center is measured, and then a percentage of particles retained in the tread rubber after the running is calculated by dividing the number A by the number of total surface area of particles (B) in 1 $mm^2$ of surface area of the tread center before the running according to the following equation:

Percentage of particles retained (%)=A/B×100

The larger the numerical value, the larger the number of particles retained in the tread rubber after the running.

(4) Braking performance on ice

The tire to be tested is run on ice road of a given ice surface temperature at a speed of 60 km/h over a distance of 200 km and then braked from a speed of 20 km/h to measure a running distance after the braking. The braking performance on ice is represented by an index on the basis that the running distance of control tire 1 is 100. The larger the index value, the better the braking performance on ice.

(5) Wear resistance

The tire to be tested is actually run on a concrete road surface of a test course at a speed of 60 km/h over a distance of 10,000 km and then the remaining groove depth is measured. The wear resistance is represented by an index on the basis that the measured groove depth in control tire is 100. The larger the index value, the better the wear resistance.

(6) Cracking appearance

The tire to be tested is actually run on a general-purpose road over a distance of 7000 km and thereafter the surface of the tread rubber is observed on the circumference of the tire. The cracking appearance is evaluated as ⊚: no crack, ○: crack length of not more than 0.5 mm, Δ: crack length of not more than 1 mm, and X: crack length of more than 1 mm.

TABLE 1

|  | Example 1 | Example 2 | Example 3 | Example 4 | Example 5 | Example 6 | Example 7 | Example 8 | Example 9 | Example 10 |
|---|---|---|---|---|---|---|---|---|---|---|
| (part by weight) | | | | | | | | | | |
| NR | 60 | 60 | 60 | 60 | 60 | 60 | 60 | 60 | 60 | 60 |
| BR | 40 | 40 | 40 | 40 | 40 | 40 | 40 | 40 | 40 | 40 |
| SBR | — | — | — | — | — | — | — | — | — | — |
| Carbon black N 220 | 50 | 50 | 50 | 50 | 50 | 50 | 50 | 50 | 50 | 50 |

TABLE 1-continued

|  |  |  |  |  |  |  |  |  |  |  |
|---|---|---|---|---|---|---|---|---|---|---|
| Stearic acid | 1.5 | 1.5 | 1.5 | 1.5 | 1.5 | 1.5 | 1.5 | 1.5 | 1.5 | 1.5 |
| ZnO | 3.0 | 3.0 | 3.0 | 3.0 | 3.0 | 3.0 | 3.0 | 3.0 | 3.0 | 3.0 |
| Antioxidant | 1.0 | 1.0 | 1.0 | 1.0 | 1.0 | 1.0 | 1.0 | 1.0 | 1.0 | 1.0 |
| Vulcanization accelerator DM *1 | 0.2 | 0.2 | 0.2 | 0.2 | 0.2 | 0.2 | 0.2 | 0.2 | 0.2 | 0.2 |
| Vulcanization accelerator CZ *2 | 0.5 | 0.5 | 0.5 | 0.5 | 0.5 | 0.5 | 0.5 | 0.5 | 0.5 | 0.5 |
| Sulfur | 1.1 | 1.1 | 1.1 | 1.1 | 1.1 | 1.1 | 1.1 | 1.1 | 1.1 | 1.1 |
| Kind and amount of coupling agent | A1.0 | A1.0 | A1.0 | A1.0 | A1.0 | A1.0 | A1.0 | A1.0 | A1.0 | A1.0 |
| Particle kind | T | U | U | W | R | A | B | C | D | F |
| (part by weight) | 10 | 10 | 10 | 10 | 10 | 10 | 10 | 10 | 10 | 10 |
| size (μm) | 70 | 55 | 25 | 18 | 70 | 70 | 70 | 70 | 70 | 8 |
| hardness (JIS C-type) | 99 | 99 | 99 | 99 | 99 | 93 | 99 | 93 | 99 | 99 |
| Kneading temperature (°C.) | 155 | 155 | 155 | 155 | 155 | 155 | 155 | 155 | 155 | 155 |
| Foaming agent DPT/urea *3 | 5.0 | 5.0 | 5.0 | 5.0 | 5.0 | 5.0 | 5.0 | 5.0 | 5.0 | 5.0 |
| ADCA *4 | — | — | — | — | — | — | — | — | — | — |
| urea | — | — | — | — | — | — | — | — | — | — |
| ADCA/urea | — | — | — | — | — | — | — | — | — | — |
| Expansion ratio (%) | 20 | 20 | 20 | 20 | 20 | 20 | 20 | 20 | 20 | 20 |
| Index of resistance to breakage | 102 | 103 | 104 | 105 | 101 | 101 | 101 | 101 | 101 | 103 |
| E' (−20° C.) (×$10^6$ dyn/cm$^2$) | 90 | 90 | 90 | 90 | 90 | 90 | 90 | 90 | 90 | 90 |
| Percentage of particles retained in tread rubber after the running | 90 | 92 | 93 | 94 | 88 | 87 | 88 | 86 | 88 | 92 |
| Braking performance on ice (−2° C.) | 136 | 138 | 135 | 130 | 129 | 128 | 132 | 127 | 130 | 111 |
| Braking performance on ice (−8° C.) | 126 | 126 | 124 | 121 | 120 | 120 | 122 | 119 | 120 | 106 |
| Wear resistance | 101 | 100 | 100 | 100 | 100 | 100 | 100 | 101 | 100 | 101 |
| Cracking appearance | ⊚ | ⊚ | ⊚ | ⊚ | ⊚ | ⊚ | ⊚ | ⊚ | ⊚ | ⊚ |

|  | Comparative Example 1 | Comparative Example 2 | Example 11 | Comparative Example 3 | Example 12 | Example 13 | Comparative Example 4 | Comparative Example 5 | Example 14 |
|---|---|---|---|---|---|---|---|---|---|
| (part by weight) |  |  |  |  |  |  |  |  |  |
| NR | 60 | 60 | 60 | 60 | 60 | 60 | 60 | 60 | 60 |
| BR | 40 | 40 | 40 | 40 | 40 | 40 | 40 | 40 | 40 |
| SBR | — | — | — | — | — | — | — | — | — |
| Carbon black N 220 | 55 | 50 | 50 | 50 | 55 | 45 | 55 | 40 | 50 |
| Stearic acid | 1.5 | 1.5 | 1.5 | 1.5 | 1.5 | 1.5 | 1.5 | 1.5 | 1.5 |
| ZnO | 3.0 | 3.0 | 3.0 | 3.0 | 3.0 | 3.0 | 3.0 | 3.0 | 3.0 |
| Antioxidant | 1.0 | 1.0 | 1.0 | 1.0 | 1.0 | 1.0 | 1.0 | 1.0 | 1.0 |
| Vulcanization accelerator DM *1 | 0.2 | 0.2 | 0.2 | 0.2 | 0.2 | 0.2 | 0.2 | 0.2 | 0.2 |
| Vulcanization accelerator CZ *2 | 0.3 | 0.5 | 0.5 | 0.5 | 0.5 | 0.5 | 0.5 | 0.5 | 0.5 |
| Sulfur | 1.1 | 1.1 | 1.1 | 1.1 | 1.1 | 1.1 | 1.1 | 1.1 | 1.1 |
| Kind and amount of coupling agent | — | A1.0 | A1.0 | A1.0 | A0.3 | A3.0 | A0.1 | A3.5 | B1.0 |
| Particle kind | — | K | G | H | B | B | B | B | B |
| (part by weight) | — | 10 | 10 | 10 | 3 | 30 | 1 | 35 | 10 |
| size (μm) | — | 2 | 240 | 300 | 70 | 70 | 70 | 70 | 70 |
| hardness (JIS C-type) | — | 99 | 99 | 99 | 99 | 99 | 99 | 99 | 99 |
| Kneading temperature (°C.) | 155 | 155 | 155 | 155 | 155 | 155 | 155 | 155 | 155 |
| Foaming agent DPT/urea *3 | 5.2 | 5.0 | 5.0 | 5.0 | 5.0 | 5.0 | 5.2 | 5.0 | 5.0 |
| ADCA *4 | — | — | — | — | — | — | — | — | — |
| urea | — | — | — | — | — | — | — | — | — |
| ADCA/urea | — | — | — | — | — | — | — | — | — |
| Expansion ratio (%) | 20 | 20 | 20 | 20 | 20 | 20 | 20 | 20 | 20 |
| Index of resistance to breakage | 100 | 104 | 100 | 94 | 102 | 100 | 102 | 98 | 101 |
| E' (−20° C.) (×$10^6$ dyn/cm$^2$) | 90 | 90 | 90 | 90 | 90 | 90 | 90 | 90 | 90 |
| Percentage of particles retained in tread rubber after the running | — | 92 | 76 | 72 | — | 87 | — | 86 | 89 |
| Braking performance on ice (−2° C.) | 100 | 100 | 110 | 102 | 108 | 130 | 100 | 130 | 131 |
| Braking performance on ice (−8° C.) | 100 | 100 | 107 | 100 | 107 | 122 | 100 | 119 | 123 |
| Wear resistance | 100 | 100 | 100 | 90 | 100 | 100 | 101 | 96 | 100 |
| Cracking appearance | ⊚ | ⊚ | ○ | x | ⊚ | ○ | ⊚ | x | ⊚ |

TABLE 1-continued

| | Comparative Example 6 | Example 15 | Comparative Example 7 | Example 16 | Comparative Example 8 | Comparative Example 9 | Comparative Example 10 | Comparative Example 11 |
|---|---|---|---|---|---|---|---|---|
| (part by weight) | | | | | | | | |
| NR | 60 | 60 | 60 | 60 | 60 | 60 | 60 | 60 |
| BR | 40 | 40 | 40 | 40 | 40 | 40 | 40 | 40 |
| SBR | — | — | — | — | — | — | — | — |
| Carbon black N 220 | 55 | 55 | 40 | 45 | 50 | 50 | 55 | 40 |
| Stearic acid | 1.5 | 1.5 | 1.5 | 1.5 | 1.5 | 1.5 | 1.5 | 1.5 |
| ZnO | 3.0 | 3.0 | 3.0 | 3.0 | 3.0 | 3.0 | 3.0 | 3.0 |
| Antioxidant | 1.0 | 1.0 | 1.0 | 1.0 | 1.0 | 1.0 | 1.0 | 1.0 |
| Vulcanization accelerator DM *1 | 0.2 | 0.2 | 0.2 | 0.2 | 0.2 | 0.2 | 0.2 | 0.2 |
| Vulcanization accelerator CZ *2 | 0.5 | 0.5 | 0.5 | 0.5 | 0.5 | 0.5 | 0.5 | 0.5 |
| Sulfur | 1.1 | 1.1 | 1.1 | 1.1 | 1.1 | 1.1 | 1.1 | 1.1 |
| Kind and amount of coupling agent | — | A1.0 | — | A1.0 | A1.0 | A1.0 | — | — |
| Particle kind | — | B | — | B | B | B | — | — |
| (part by weight) | — | 10 | — | 10 | 10 | 10 | — | — |
| size (μm) | — | 70 | — | 70 | 70 | 70 | — | — |
| hardness (JIS C-type) | — | 99 | — | 99 | 99 | 99 | — | — |
| Kneading temperature (°C.) | 155 | 155 | 155 | 155 | 155 | 155 | 155 | 155 |
| Foaming agent DPT/urea *3 | 3.3 | 3.1 | 7.1 | 7.0 | 3.0 | 7.7 | 3.1 | 8.0 |
| ADCA *4 | — | — | — | — | — | — | — | — |
| urea | — | — | — | — | — | — | — | — |
| ADCA/urea | — | — | — | — | — | — | — | — |
| Expansion ratio (%) | 5 | 5 | 35 | 35 | 3 | 40 | 3 | 40 |
| Index of resistance to breakage | <100> | <100> | <100> | <100> | [100] | {99} | [100] | {100} |
| E' (−20° C.) (×10⁶ dyn/cm²) | 120 | 120 | 65 | 65 | 120 | 60 | 120 | 60 |
| Percentage of particles retained in tread rubber after the running | — | 87 | — | 87 | 86 | 86 | — | — |
| Braking performance on ice (−2° C.) | 100 | 125 | 100 | 113 | 100 | 111 | 100 | 100 |
| Braking performance on ice (−8° C.) | 100 | 118 | 100 | 106 | 100 | 106 | 100 | 100 |
| Wear resistance | 100 | 100 | 100 | 100 | 98 | 100 | 100 | 100 |
| Cracking appearance | ◎ | ◎ | ○ | ○ | ◎ | x | ◎ | ○ |

| | Comparative Example 12 | Example 17 | Example 18 | Comparative Example 13 | Example 19 | Example 20 | Example 21 | Example 22 | Example 23 | Example 24 |
|---|---|---|---|---|---|---|---|---|---|---|
| (part by weight) | | | | | | | | | | |
| NR | 60 | 60 | 60 | 60 | 60 | 60 | 60 | 60 | 60 | 60 |
| BR | 40 | 40 | 40 | 40 | 40 | 40 | 40 | 40 | 40 | 40 |
| SBR | — | — | — | — | — | — | — | — | — | — |
| Carbon black N 220 | 50 | 50 | 50 | 50 | 50 | 50 | 50 | 50 | 50 | 50 |
| Stearic acid | 1.5 | 1.5 | 1.5 | 1.5 | 1.5 | 1.5 | 1.5 | 1.5 | 1.5 | 1.5 |
| ZnO | 3.0 | 3.0 | 3.0 | 3.0 | 3.0 | 3.0 | 3.0 | 3.0 | 3.0 | 3.0 |
| Antioxidant | 1.0 | 1.0 | 1.0 | 1.0 | 1.0 | 1.0 | 1.0 | 1.0 | 1.0 | 1.0 |
| Vulcanization accelerator DM *1 | 0.2 | 0.2 | 0.2 | 0.2 | 0.2 | 0.2 | 0.2 | 0.2 | 0.2 | 0.2 |
| Vulcanization accelerator CZ *2 | 0.5 | 0.5 | 0.5 | 0.5 | 0.5 | 0.5 | 0.5 | 0.5 | 0.5 | 0.5 |
| Sulfur | 1.1 | 1.1 | 1.1 | 1.1 | 1.1 | 1.1 | 1.1 | 1.1 | 1.1 | 1.1 |
| Kind and amount of coupling agent | — | A0.3 | A5.0 | A6.0 | A1.0 | A1.0 | A1.0 | A1.0 | A1.0 | A1.0 |
| Particle kind | A | A | A | A | I | B | J | E | F | G |
| (part by weight) | 10 | 10 | 10 | 10 | 10 | 10 | 10 | 10 | 10 | 10 |
| size (μm) | 70 | 70 | 70 | 70 | 40 | 70 | 120 | 15 | 8 | 240 |
| hardness (JIS C-type) | 93 | 93 | 93 | 93 | 99 | 99 | 99 | 99 | 99 | 99 |
| Kneading temperature (°C.) | 155 | 155 | 155 | 155 | 155 | 155 | 155 | 155 | 155 | 155 |
| Foaming agent DPT/urea *3 | 5.0 | 5.0 | 5.0 | 5.0 | — | — | — | — | — | — |
| ADCA *4 | — | — | — | — | 5.0 | 5.0 | 5.0 | 5.0 | 5.0 | 5.0 |
| urea | — | — | — | — | 2.5 | 2.5 | 2.5 | 2.5 | 2.5 | 2.5 |
| ADCA/urea | — | — | — | — | — | — | — | — | — | — |
| Expansion ratio (%) | 20 | 20 | 20 | 20 | 20 | 20 | 20 | 20 | 20 | 20 |
| Index of resistance to breakage | 99 | 100 | 102 | 100 | 100 | 101 | 100 | 102 | 102 | 100 |

TABLE 1-continued

| | | | | | | | | | |
|---|---|---|---|---|---|---|---|---|---|
| E' (−20° C.) (×10⁶ dyn/cm²) | 90 | 90 | 95 | 120 | 90 | 90 | 90 | 90 | 90 | 90 |
| Percentage of particles retained in tread rubber after the running | 11 | 67 | 94 | 95 | 88 | 87 | 85 | 89 | 89 | 75 |
| Braking performance on ice (−2° C.) | 100 | 110 | 122 | 118 | 130 | 130 | 121 | 133 | 122 | 102 |
| Braking performance on ice (−8° C.) | 100 | 105 | 116 | 113 | 121 | 120 | 116 | 124 | 114 | 101 |
| Wear resistance | 97 | 100 | 100 | 98 | 100 | 100 | 100 | 100 | 100 | 100 |
| Cracking appearance | x | ○ | ⊚ | Δ | ⊚ | ⊚ | ⊚ | ⊚ | ⊚ | ○ |

| | Comparative Example 14 | Comparative Example 15 | Example 25 | Example 26 | Example 27 | Comparative Example 16 | Comparative Example 17 | Example 28 |
|---|---|---|---|---|---|---|---|---|
| (part by weight) | | | | | | | | |
| NR | 60 | 60 | 60 | 60 | 60 | 60 | 60 | 60 |
| BR | 40 | 40 | 40 | 40 | 40 | 40 | 40 | 40 |
| SBR | — | — | — | — | — | — | — | — |
| Carbon black N 220 | 50 | 55 | 50 | 50 | 50 | 50 | 50 | 50 |
| Stearic acid | 1.5 | 1.5 | 1.5 | 1.5 | 1.5 | 1.5 | 1.5 | 1.5 |
| ZnO | 3.0 | 3.0 | 3.0 | 3.0 | 3.0 | 3.0 | 3.0 | 3.0 |
| Antioxidant | 1.0 | 1.0 | 1.0 | 1.0 | 1.0 | 1.0 | 1.0 | 1.0 |
| Vulcanization accelerator DM *1 | 0.2 | 0.2 | 0.2 | 0.2 | 0.2 | 0.2 | 0.2 | 0.2 |
| Vulcanization accelerator CZ *2 | 0.5 | 0.5 | 0.5 | 0.5 | 0.5 | 0.5 | 0.5 | 0.5 |
| Sulfur | 1.1 | 1.1 | 1.1 | 1.1 | 1.1 | 1.1 | 1.1 | 1.1 |
| Kind and amount of coupling agent | A1.0 | — | A1.0 | A1.0 | A1.0 | A1.0 | A1.0 | A1.0 |
| Particle kind | K | — | N | M | L | H | O | P |
| (part by weight) | 10 | — | 10 | 10 | 10 | 10 | 10 | 10 |
| size (μm) | 2 | — | 70 | 70 | 70 | 300 | 70 | 70 |
| hardness (JIS C-type) | 99 | — | 93 | 92 | 92 | 99 | 91 | 76 |
| Kneading temperature (°C.) | 155 | 155 | 155 | 155 | 155 | 155 | 155 | 155 |
| Foaming agent DPT/urea *3 | — | — | 5.0 | 5.0 | 5.0 | — | 5.0 | 5.0 |
| ADCA *4 | 5.0 | 5.2 | — | — | — | 5.0 | — | — |
| urea | 2.5 | 2.5 | — | — | — | 2.5 | — | — |
| ADCA/urea | — | — | — | — | — | — | — | — |
| Expansion ratio (%) | 20 | 20 | 20 | 20 | 20 | 20 | 20 | 20 |
| Index of resistance to breakage | 104 | 100 | 100 | 100 | 100 | 94 | 93 | 101 |
| E' (−20° C.) (×10⁶ dyn/cm²) | 90 | 90 | 90 | 90 | 90 | 90 | 90 | 90 |
| Percentage of particles retained in tread rubber after the running | 90 | — | 76 | 73 | 72 | 62 | 8 | 89 |
| Braking performance on ice (−2° C.) | 100 | 100 | 122 | 114 | 108 | 100 | 100 | 106 |
| Braking performance on ice (−8° C.) | 100 | 100 | 117 | 112 | 107 | 100 | 100 | 104 |
| Wear resistance | 100 | 100 | 100 | 100 | 100 | 87 | 86 | 100 |
| Cracking appearance | ⊚ | ⊚ | ⊚ | ⊚ | ⊚ | x | x | ⊚ |

| | Comparative Example 18 | Comparative Example 19 | Comparative Example 20 | Comparative Example 21 | Example 29 | Example 30 | Comparative Example 22 |
|---|---|---|---|---|---|---|---|
| (part by weight) | | | | | | | |
| NR | 60 | 60 | 60 | 60 | 60 | 70 | 70 |
| BR | 40 | 40 | 40 | 40 | 40 | 30 | 30 |
| SBR | — | — | — | — | — | — | — |
| Carbon black N 220 | 50 | 50 | 50 | 50 | 50 | 50 | 50 |
| Stearic acid | 1.5 | 1.5 | 1.5 | 1.5 | 1.5 | 1.5 | 1.5 |
| ZnO | 3.0 | 3.0 | 3.0 | 3.0 | 3.0 | 4.0 | 4.0 |
| Antioxidant | 1.0 | 1.0 | 1.0 | 1.0 | 1.0 | 1.0 | 1.0 |
| Vulcanization accelerator DM *1 | 0.2 | 0.2 | 0.2 | 0.2 | 0.2 | 0.2 | 0.2 |
| Vulcanization accelerator CZ *2 | 0.5 | 0.5 | 0.5 | 0.5 | 0.5 | 0.5 | 0.5 |
| Sulfur | 1.1 | 1.1 | 1.1 | 1.1 | 1.1 | 1.2 | 1.2 |
| Kind and amount of coupling agent | A1.0 | A1.0 | A1.0 | A1.0 | A1.0 | A1.5 | A1.5 |
| Particle kind | Q | $S_1$ | $S_2$ | $S_3$ | X | V | $S_2$ |
| (part by weight) | 10 | 10 | 10 | 10 | 10 | 15 | 15 |
| size (μm) | 70 | 70 | 40 | 15 | 52.5 | 25 | 40 |
| hardness | 72 | 99 | 99 | 99 | 99 | 99 | 99 |

TABLE 1-continued

|  | | | | | | | | |
|---|---|---|---|---|---|---|---|---|
| (JIS C-type) Kneading temperature (°C.) | 155 | 155 | 155 | 155 | 155 | 155 | 155 | |
| Foaming agent DPT/urea *3 | 5.0 | 5.0 | 5.0 | 5.0 | 5.0 | — | — | |
| ADCA *4 | — | — | — | — | — | — | — | |
| urea | — | — | — | — | — | — | — | |
| ADCA/urea | — | — | — | — | — | 6.5 | 6.5 | |
| Expansion ratio (%) | 20 | 20 | 20 | 20 | 20 | 20 | 20 | |
| Index of resistance to breakage | 101 | 94 | 95 | 94 | 100 | 102 | 91 | |
| E' (−20° C.) (×10⁶ dyn/cm²) | 90 | 90 | 90 | 90 | 90 | 140 | 140 | |
| Percentage of particles retained in tread rubber after the running | 86 | 7 | 10 | 12 | 90 | 92 | 10 | |
| Braking performance on ice (−2° C.) | 100 | 100 | 100 | 100 | 135 | 137 | 100 | |
| Braking performance on ice (−8° C.) | 100 | 100 | 100 | 100 | 124 | 126 | 100 | |
| Wear resistance | 100 | 88 | 89 | 89 | 100 | 100 | 90 | |
| Cracking appearance | ◎ | x | x | x | ◎ | ◎ | x | |

|  | Example 31 | Example 32 | Example 33 | Comparative Example 23 | Comparative Example 24 | Example 34 | Comparative Example 25 | Comparative Example 26 |
|---|---|---|---|---|---|---|---|---|
| (part by weight) | | | | | | | | |
| NR | 70 | 70 | 70 | 70 | 70 | 70 | 70 | 70 |
| BR | 30 | 30 | 30 | 30 | 30 | 30 | 30 | 30 |
| SBR | — | — | — | — | — | — | — | — |
| Carbon black N 220 | 50 | 50 | 50 | 50 | 50 | 50 | 50 | 50 |
| Stearic acid | 1.5 | 1.5 | 1.5 | 1.5 | 1.5 | 1.5 | 1.5 | 1.5 |
| ZnO | 4.0 | 4.0 | 4.0 | 4.0 | 4.0 | 4.0 | 4.0 | 4.0 |
| Antioxidant | 1.0 | 1.0 | 1.0 | 1.0 | 1.0 | 1.0 | 1.0 | 1.0 |
| Vulcanization accelerator DM *1 | 0.2 | 0.2 | 0.2 | 0.2 | 0.2 | 0.2 | 0.2 | 0.2 |
| Vulcanization accelerator CZ *2 | 0.5 | 0.5 | 0.5 | 0.5 | 0.5 | 0.5 | 0.5 | 0.5 |
| Sulfur | 1.2 | 1.2 | 1.2 | 1.2 | 1.2 | 1.2 | 1.2 | 1.2 |
| Kind and amount of coupling agent | A1.5 | A1.5 | A1.5 | A1.5 | — | A1.5 | A1.5 | B0.15 |
| Particle kind | X | A | C | V | — | M | L | A |
| (part by weight) | 15 | 15 | 15 | 15 | — | 15 | 15 | 15 |
| size (μm) | 52.5 | 70 | 70 | 25 | — | 70 | 70 | 70 |
| hardness (JIS C-type) | 99 | 93 | 93 | 99 | — | 92 | 91 | 93 |
| Kneading temperature (°C.) | 155 | 155 | 155 | 140 | 155 | 155 | 155 | 136 |
| Foaming agent DPT/urea *3 | — | — | — | — | — | — | — | — |
| ADCA *4 | — | — | — | — | — | — | — | — |
| urea | — | — | — | — | — | — | — | — |
| ADCA/urea | 6.5 | 6.5 | 6.5 | 6.5 | 6.7 | 6.5 | 6.5 | 6.5 |
| Expansion ratio (%) | 20 | 20 | 20 | 20 | <20> | <20> | <20> | <20> |
| Index of resistance to breakage | 103 | 103 | 101 | 94 | <100> | 100 | 98 | 95 |
| E' (−20° C.) (×10⁶ dyn/cm²) | 140 | 140 | 140 | 140 | 140 | 140 | 140 | 140 |
| Percentage of particles retained in tread rubber after the running | 93 | 85 | 86 | 35 | <0> | 72 | 13 | 12 |
| Braking performance on ice (−2° C.) | 137 | 129 | 130 | 103 | <100> | 108 | 101 | 102 |
| Braking performance on ice (−8° C.) | 127 | 120 | 119 | 100 | <100> | 102 | 100 | 100 |
| Wear resistance | 100 | 100 | 100 | 92 | <100> | 100 | 96 | 92 |
| Cracking appearance | ◎ | ◎ | ◎ | x | ◎ | ◎ | Δ | x |

|  | Example 35 | Example 36 | Example 37 | Comparative Example 27 | Example 38 | Comparative Example 28 | Example 39 | Comparative Example 29 |
|---|---|---|---|---|---|---|---|---|
| (part by weight) | | | | | | | | |
| NR | 70 | 70 | 70 | 70 | 50 | 50 | 70 | 70 |
| BR | 30 | 30 | 30 | 30 | 30 | 30 | — | — |
| SBR | — | — | — | — | 20 | 20 | 30 | 30 |
| Carbon black N 220 | 50 | 50 | 50 | 50 | 40 | 40 | 45 | 45 |
| Stearic acid | 1.5 | 1.5 | 1.5 | 1.5 | 2.0 | 2.0 | 2.0 | 2.0 |
| ZnO | 4.0 | 4.0 | 4.0 | 4.0 | 5.0 | 5.0 | 4.0 | 4.0 |
| Antioxidant | 1.0 | 1.0 | 1.0 | 1.0 | 1.5 | 1.5 | 1.5 | 1.5 |
| Vulcanization accelerator DM *1 | 0.2 | 0.2 | 0.2 | 0.2 | 0.3 | 0.3 | 0.2 | 0.2 |
| Vulcanization accelerator | 0.5 | 0.5 | 0.3 | 0.5 | 0.6 | 0.6 | 0.55 | 0.55 |

TABLE 1-continued

|  |  |  |  |  |  |  |  |  |
|---|---|---|---|---|---|---|---|---|
| CZ *2 |  | 1.2 | 1.2 | 1.2 | 1.2 | 1.3 | 1.3 | 0.9 | 0.9 |
| Sulfur |  | 1.2 | 1.2 | 1.2 | 1.2 | 1.3 | 1.3 | 0.9 | 0.9 |
| Kind and amount of coupling agent |  | B0.45 | B3.0 | B7.5 | B3.0 | B2.0 | — | A1.0 | — |
| Particle | kind | A | A | A | A | V | — | C | — |
|  | (part by weight) | 15 | 15 | 15 | 15 | 20 | — | 10 | — |
|  | size (μm) | 70 | 70 | 70 | 70 | 25 | — | 70 | — |
|  | hardness (JIS C-type) | 93 | 93 | 93 | 93 | 99 | — | 93 | — |
| Kneading temperature (°C.) |  | 155 | 155 | 155 | 155 | 155 | 155 | 155 | 155 |
| Foaming agent | DPT/urea *3 | — | — | — | — | — | — | — | — |
|  | ADCA *4 | — | — | — | — | — | — | — | — |
|  | urea | — | — | — | — | — | — | — | — |
|  | ADCA/urea | 6.5 | 6.5 | 6.5 | 6.5 | 6.2 | 6.4 | 5.8 | 6.0 |
| Expansion ratio (%) |  | <20> | <20> | 20 | <20> | 14 | <14> | 18 | <18> |
| Index of resistance to breakage |  | 100 | 102 | 100 | 94 | 101 | <100> | 100 | <100> |
| E' (−20° C.) (×10$^6$ dyn/cm$^2$) |  | 140 | 140 | 175 | 210 | 180 | 180 | 125 | 125 |
| Percentage of particles retained in tread rubber after the running |  | 65 | 90 | 94 | 96 | 93 | <0> | 91 | <0> |
| Braking performance on ice (−2° C.) |  | 103 | 133 | 120 | 112 | 122 | <100> | 124 | <100> |
| Braking performance on ice (−8° C.) |  | 101 | 121 | 112 | 102 | 111 | <100> | 113 | <100> |
| Wear resistance |  | 100 | 100 | 100 | 94 | 100 | <100> | 100 | <100> |
| Cracking appearance |  | ⊚ | ⊚ | ⊚ | △ | ⊚ | ⊚ | ⊚ | ○ |

|  |  | Comparative Example 30 | Example 40 | Example 41 | Example 42 | Comparative Example 31 | Comparative Example 32 | Example 43 | Example 44 |
|---|---|---|---|---|---|---|---|---|---|
| (part by weight) |  |  |  |  |  |  |  |  |  |
| NR |  | 70 | 70 | 70 | 70 | 70 | 70 | 70 | 70 |
| BR |  | — | — | — | — | 30 | 30 | 30 | 30 |
| SBR |  | 30 | 30 | 30 | 30 | — | — | — | — |
| Carbon black N 220 |  | 45 | 45 | 50 | 50 | 50 | 50 | 50 | 50 |
| Stearic acid |  | 2.0 | 2.0 | 1.5 | 1.5 | 1.5 | 1.5 | 1.5 | 1.5 |
| ZnO |  | 4.0 | 4.0 | 4.0 | 4.0 | 4.0 | 4.0 | 4.0 | 4.0 |
| Antioxidant |  | 1.5 | 1.5 | 1.0 | 1.0 | 1.0 | 1.0 | 1.0 | 1.0 |
| Vulcanization accelerator DM *1 |  | 0.2 | 0.2 | 0.2 | 0.2 | 0.2 | 0.2 | 0.2 | 0.2 |
| Vulcanization accelerator CZ *2 |  | 0.55 | 0.55 | 0.5 | 0.5 | 0.5 | 0.5 | 0.5 | 0.5 |
| Sulfur |  | 0.9 | 0.9 | 1.2 | 1.2 | 1.2 | 1.2 | 1.2 | 1.2 |
| Kind and amount of coupling agent |  | A0.15 | A0.35 | A1.5 | A1.5 | A1.5 | A1.5 | A1.5 | A1.5 |
| Particle | kind | C | C | Y | I | V | V | V | V |
|  | (part by weight) | 1.5 | 3.5 | 15 | 15 | 15 | 15 | 15 | 15 |
|  | size (μm) | 70 | 70 | 40 | 40 | 25 | 25 | 25 | 25 |
|  | hardness (JIS C-type) | 93 | 93 | 99 | 99 | 99 | 99 | 99 | 99 |
| Kneading temperature (°C.) |  | 155 | 155 | 155 | 155 | 145 | 148 | 150 | 152 |
| Foaming agent | DPT/urea *3 | — | — | — | — | — | — | — | — |
|  | ADCA *4 | — | — | — | — | — | — | — | — |
|  | urea | — | — | — | — | — | — | — | — |
|  | ADCA/urea | 5.9 | 5.9 | 6.5 | 6.5 | 6.5 | 6.5 | 6.5 | 6.5 |
| Expansion ratio (%) |  | 18 | 18 | 20 | 20 | 20 | 20 | 20 | 20 |
| Index of resistance to breakage |  | 100 | 100 | 101 | 102 | 96 | 99 | 100 | 100 |
| E' (−20° C.) (×10$^6$ dyn/cm$^2$) |  | 125 | 125 | 140 | 140 | 140 | 140 | 140 | 140 |
| Percentage of particles retained in tread rubber after the running |  | 92 | 92 | 90 | 89 | 40 | 44 | 50 | 70 |
| Braking performance on ice (−2° C.) |  | 100 | 104 | 135 | 133 | 103 | 104 | 106 | 121 |
| Braking performance on ice (−8° C.) |  | 100 | 101 | 126 | 124 | 100 | 100 | 103 | 113 |

TABLE 1-continued

| Wear resistance | 100 | 100 | 100 | 100 | 95 | 98 | 100 | 100 |
|---|---|---|---|---|---|---|---|---|
| | ◎ | ◎ | ◎ | ◎ | x | △ | ○ | ◎ |
| Cracking appearance | | | | | | | | |

Note)
*1: dibenzothiazyl disulfide
*2: N-cyclohexyl-2-benzothiazyl sulfenamide
*3: mixture of dinitrosopentamethylene tetramine and urea having a mixing ratio (by weight) of 1:1
*4: azodicarbonamide
The coupling agents A and B used in Table 1 are as follows:
A: bis(3-triethoxysilylpropyl) tetrasulfide
B: trimethoxysilylpropyl benzothiazole tetrasulfide The kinds A-Y of the particles used in Table 1 are shown in Table 2.

TABLE 2

| Kind of particle | Composition (weight ratio) | JIS C-type hardness | Average particle size (μm) |
|---|---|---|---|
| A | Al(OH)$_3$/PMMA = 4/6 | 93 | 70 |
| B | Al(OH)$_3$/PMMA = 6/4 | 99 | 70 |
| C | SiO$_2$/PMMA = 4/6 | 93 | 70 |
| D | SiO$_2$/PMMA = 6/4 | 99 | 70 |
| E | Al(OH)$_3$/PMMA = 6/4 | 99 | 15 |
| F | Al(OH)$_3$/PMMA = 6/4 | 99 | 8 |
| G | Al(OH)$_3$/PMMA = 6/4 | 99 | 240 |
| H | Al(OH)$_3$/PMMA = 6/4 | 99 | 300 |
| I | Al(OH)$_3$/PMMA = 6/4 | 99 | 40 |
| J | Al(OH)$_3$/PMMA = 6/4 | 99 | 120 |
| K | Al(OH)$_3$/PMMA = 6/4 | 99 | 2 |
| L | Al(OH)$_3$/PMMA = 2/8 | 92 | 70 |
| M | Al(OH)$_3$/PMMA = 2.5/7.5 | 92 | 70 |
| N | Al(OH)$_3$/PMMA = 3/7 | 93 | 70 |
| O | PMMA 100% | 91 | 70 |
| P | Al(OH)$_3$/PVA = 6/4 | 76 | 70 |
| Q | Al(OH)$_3$/PVA = 4/6 | 72 | 70 |
| R | Al(OH)$_3$/SiO$_2$/PMMA = 3/3/4 | 99 | 70 |
| S | Al$_2$O$_3$ | 99 | T$_1$: 70 |
| | | | T$_2$: 40 |
| | | | T$_3$: 15 |
| T | Al(OH)$_3$ | 99 | 70 |
| U | Al(OH)$_3$ | 99 | 55 |
| V | Al(OH)$_3$ | 99 | 25 |
| W | Al(OH)$_3$ | 99 | 18 |
| X | SiO$_2$ | 99 | 52.5 |
| Y | Al(OH)$_3$/PMMA = 8/2 | 99 | 40 |

Particles A, B, E-K, Y: crushed product of synthetic marble
Particles C, L-N, P-R: trial product
Particle O: powder of polymethyl methacrylate resin (made by Mitsubishi Rayon Co., Ltd. trade name: Acrypet IR-VH)
Particle S: trade name: Alumina A-12C, made by Showa Denko K.K. The particles are saved into S$_1$: average particle size of 70 μm, S$_1$: average particle size of 40 μm and S$_3$: average particle size of 15 μm.
Particle T: trade name: Hidilite H-10C, made by Showa Denko K.K.
Particle U: trade name: Hidilite H-10A, made by Showa Denko K.K.
Particle Y: trade name: Hidilite H-21, made by Showa Denko K.K.
Particle W: trade name: Hidilite H-31, made by Showa Denko K.K.
Particle X: trade name: Silica Gel 60, Product No. 9385-2M, made by Merck & Co., Inc.

In Table 1, the control for Examples 1-14, 17-18 and 25-29 is Comparative Example 1, and the control for Example 15 is Comparative Example 6, and the control for Example 16 is Comparative Example 7, and the control for Examples 19-24 is Comparative Example 15, and the control for Examples 30-37 and 43-44 is Comparative Example 24, and the control for Example 38 is Comparative Example 28, and the control for Examples 39-42 is Comparative Example 29.

As seen from Table 1, according to the invention, excellent performance on ice is developed not only on an ice road surface of -2° C. having a large water content but also on an ice road surface of -8° C. having a very high ice hardness. Furthermore, durability is sufficiently improved without degrading the wear resistance and creating cracks.

Moreover, the requirements for the particles used in the invention are satisfied by the synthetic marble, so that waste building materials can effectively be utilized.

As mentioned above, the invention can provide the foamed rubber composition stably developing excellent performances on ice over a wide ice temperature range by incorporating particles containing Al—OH and/or Si—OH group in its surface and a particular silane coupling agent into a foaming rubber to ensure the bonding of these particles to rubber and avoid the separation of these particles from rubber, and pneumatic tires having excellent running performances on ice without degrading of the wear resistance and fatigue properties.

What is claimed is:

1. A foamed rubber composition comprising 3-30 parts by weight, based on 100 parts by weight of rubber ingredient, of particles having a JIS C-type hardness of not less than 75 and an average particle size of 5-250 μm and containing an organic binder and aluminum-bonded hydroxy groups and/or silicon-bonded hydroxy groups at its surface, and 3-50% by weight, based on the weight of the particles, of at least one silane coupling agent represented by the following general formula:

$$Y_3-Si-C_nH_{2n}A$$

wherein A is —S$_m$C$_n$H$_{2n}$Si—Y3 group or S$_m$Z group, Y is an alkyl or alkoxy group having a carbon number of 1-4 or chlorine atom, provided that three Y groups may be same or different, Z is

[chemical structures: benzothiazolyl group, —C(=S)—N(CH$_3$)$_2$, or —C(=O)—C(CH$_3$)=CH$_2$]

and m and n are an integer of 1-6, respectively.

2. A foamed rubber composition according to claim 1, wherein the particle consists of at least 20% by weight of at least one selected from Al(OH)$_3$ and SiO$_2$ and the remainder being an organic binder.

3. A foamed rubber composition according to claim 1, wherein the foamed rubber composition has an expansion ratio of 5–35%.

4. A method of producing a foamed rubber composition by kneading at least rubber ingredient, a silane coupling agent and particles having an average particle size of 5–250 µm, adding with a foaming agent and then curing, characterized in that at least one compound represented by the following general formula:

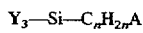

wherein A is —S$_m$C$_n$H$_{2n}$Si—Y$_3$ group or S$_m$Z group. Y is an alkyl or alkoxy group having a carbon number of 1–4 or chlorine atom, provided that three Y groups may be same or different, Z is

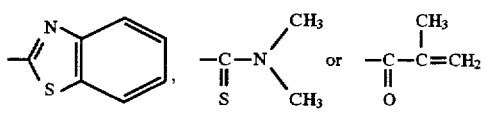

and m and n are an integer of 1–6, respectively, is used as the silane coupling agent, and the particles have a JIS C-type hardness of not less than 75 and contain an organic binder aluminum-bonded hydroxy groups and/or silicon-bonded hydroxy groups at its surface, and the kneading is carried out at a temperature of at least 150° C.

5. The method according to claim 4, wherein the particle consists of at least 20% by weight of at least one selected from Al(OH)$_3$ and SiO$_2$ and the remainder being an organic binder.

6. The method according to claim 4, wherein the particles is added in an amount of 3–30 parts by weight based on 100 parts by weight of the rubber ingredient, and the silane coupling agent is used in an amount of 3–50% by weight based on the weight of the particles.

7. The method according to claim 4, wherein the curing is carried out at an expansion ratio of 5–35%.

8. A pneumatic tire comprising a tread, said tread being made from a foamed rubber composition comprising 3–30 parts by weight, based on 100 parts by weight of rubber ingredient, of particles having a JIS C-type hardness of not less than 75 and an average particle size of 5–250 µm and containing an organic binder aluminum-bonded hydroxy groups and/or silicon-bonded hydroxy groups at its surface, and 3–50% by weight, based on the weight of the particles, of at least one silane coupling agent represented by the following general formula:

wherein A is —S$_m$C$_n$H$_{2n}$Si—Y3 group or S$_m$—Z group, Y is an alkyl or alkoxy group having a carbon number of 1–4 or chlorine atom, provided that three Y groups may be same or different, Z is

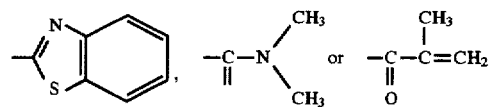

and m and n are an integer of 1–6, respectively, and having an expansion ratio of 5–35%.

9. A pneumatic tire according to claim 8, wherein the particle consists of at least 20% by weight of at least one selected from Al(OH)$_3$ and SiO$_2$ and the remainder being an organic binder.

* * * * *